United States Patent
Zhou et al.

(10) Patent No.: US 9,879,137 B2
(45) Date of Patent: *Jan. 30, 2018

(54) FLAME RETARDANT POLY(HEXAMETHYLENE ADIPAMIDE)

(71) Applicant: PolyOne Corporation, Avon Lake, OH (US)

(72) Inventors: Chongfu Zhou, Avon, OH (US); Roger W. Avakian, Solon, OH (US)

(73) Assignee: PolyOne Corporation, Avon Lake, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/910,836

(22) PCT Filed: Aug. 7, 2014

(86) PCT No.: PCT/US2014/050185
§ 371 (c)(1),
(2) Date: Feb. 8, 2016

(87) PCT Pub. No.: WO2015/021302
PCT Pub. Date: Feb. 12, 2015

(65) Prior Publication Data
US 2016/0185962 A1    Jun. 30, 2016

Related U.S. Application Data

(60) Provisional application No. 61/863,628, filed on Aug. 8, 2013.

(51) Int. Cl.
| | | |
|---|---|---|
| C08L 77/02 | (2006.01) | |
| C09K 21/14 | (2006.01) | |
| C08L 77/06 | (2006.01) | |
| C08L 71/12 | (2006.01) | |
| C08L 71/02 | (2006.01) | |
| B29C 43/24 | (2006.01) | |
| B29C 51/00 | (2006.01) | |
| C08L 85/02 | (2006.01) | |
| B29C 64/165 | (2017.01) | |
| B33Y 10/00 | (2015.01) | |
| B33Y 70/00 | (2015.01) | |
| B33Y 80/00 | (2015.01) | |
| B29K 69/00 | (2006.01) | |
| B29K 77/00 | (2006.01) | |

(52) U.S. Cl.
CPC ............ C08L 77/02 (2013.01); B29C 43/24 (2013.01); B29C 51/00 (2013.01); B29C 64/165 (2017.08); C08L 71/02 (2013.01); C08L 77/06 (2013.01); C08L 85/02 (2013.01); C09K 21/14 (2013.01); B29K 2069/00 (2013.01); B29K 2077/00 (2013.01); B33Y 10/00 (2014.12); B33Y 70/00 (2014.12); B33Y 80/00 (2014.12); C08L 2201/02 (2013.01); C08L 2205/03 (2013.01); C08L 2205/035 (2013.01)

(58) Field of Classification Search
CPC .......... C08L 77/02; C08L 85/02; C08L 71/12
See application file for complete search history.

(56) References Cited

U.S. PATENT DOCUMENTS

| | | | |
|---|---|---|---|
| 4,331,614 A * | 5/1982 | Schmidt ................ | C08G 79/04 528/167 |
| 4,332,714 A * | 6/1982 | Haaf .................... | C08K 5/0016 524/141 |
| 4,788,259 A | 11/1988 | Nielinger et al. | |
| 4,822,836 A * | 4/1989 | Wroczynski ............ | C08K 5/09 524/139 |
| 4,888,370 A | 12/1989 | Freitag et al. | |
| 5,071,894 A | 12/1991 | Weil et al. | |
| 5,258,439 A | 11/1993 | Togashi et al. | |
| 6,410,621 B1 | 6/2002 | Martin | |
| 8,975,367 B2 | 3/2015 | Freitag et al. | |
| 2001/0007888 A1* | 7/2001 | Asano ................ | C08K 5/34928 524/115 |
| 2006/0014866 A1 | 1/2006 | Ottenheijm | |
| 2009/0043013 A1* | 2/2009 | Stahl ...................... | C08L 67/02 523/351 |
| 2012/0034478 A1* | 2/2012 | Pepers .................. | C08F 279/02 428/463 |
| 2014/0224529 A1* | 8/2014 | Dobashi ................ | H05K 3/285 174/254 |
| 2014/0308505 A1 | 10/2014 | Schmitt | |
| 2016/0122534 A1* | 5/2016 | Zhou ...................... | C08L 69/00 524/151 |

FOREIGN PATENT DOCUMENTS

| | | | | |
|---|---|---|---|---|
| DE | 4007730 A1 * | 9/1991 | .......... | C08K 5/5333 |
| EP | 0436136 A1 * | 7/1991 | .......... | C08G 65/485 |
| GB | 2043083 A * | 10/1980 | ............ | C08K 5/523 |

OTHER PUBLICATIONS

Machine translated English language equivalent of DE 4007730 (Sep. 1991, 11 pages).*

Leong (Evaluation of polyphosphates and polyphosphonates as degradable biomaterials. Journal of Biomedical Materials Research. 25, 1991. pp. 1151-1167).*

* cited by examiner

Primary Examiner — Brieann R Johnston
(74) Attorney, Agent, or Firm — Michael J. Sambrook; Maria M. Hoke

(57) ABSTRACT

Poly(hexamethylene adipamide), (also referred to as Nylon 6,6) compounds that are flame retardant using non-halogenated ingredients are disclosed. Polyphenylene ether or bismaleimides act as synergists when used in specific amounts in combination with polyphosphonate to achieve a V-1 or V-0 rating in a UL 94 test at thicknesses of about 3.18 mm.

9 Claims, No Drawings

FLAME RETARDANT POLY(HEXAMETHYLENE ADIPAMIDE)

CLAIM OF PRIORITY

This application claims priority from U.S. Provisional Patent Application Ser. No. 61/863,628 and filed on Aug. 8, 2013, which is incorporated by reference.

FIELD OF THE INVENTION

The present invention concerns poly(hexamethylene adipamide), (also referred to as Nylon 6,6) compounds that are flame retardant using non-halogenated ingredients.

BACKGROUND OF THE INVENTION

Thermoplastic compounds, unlike wood, metal, or glass, do not rot, rust, or shatter. For that reason, the world in the past seventy years has seen a revolution in material science arising from the combination of a thermoplastic resin and one or more functional additives to provide specific properties to the resin.

Unlike wood but like metal and glass, at a given temperature, a thermoplastic resin can melt. Its processing versatility benefits from its capacity to mix with the functional additives while in a molten state.

But in use, the exposure of a fully formed thermoplastic article to excessive heat or flame can be quite detrimental to property and person. Flame retardancy is a key attribute for many household items, for example hair dryers, curtains and drapes, water heaters and kitchen appliances. In addition, materials that are non-flammable and non-combustible are critical for many applications in industries, such as electronics, telecommunications, and transportation. Therefore, flame retardants, drip suppressants, mineral fillers, and char formers are frequently added as functional additives to help thermoplastic compounds retard the effects of heat or flame from melting or even burning.

Recently non-halogenated flame retardants have become popular because they minimize the release of halogenated chemicals if the plastic article would begin to degrade, melt, or burn. However, polymer blends using non-halogenated flame retardants are often more difficult to process and have reduced physical and mechanical properties when compared to the original thermoplastic resin.

SUMMARY OF THE INVENTION

What the art needs is a non-halogenated nylon 6,6 capable of passing the Underwriters' Laboratories Test No. 94 (UL 94 test) by achieving a V-1 or V-0 rating at a thickness of at least 3.18 mm.

Even with the variety of functional additives commercially available, it is not a predictable pathway for a person having ordinary skill in the art to find a particular combination of ingredients which, together, can achieve a V-0 or V-1 rating in a UL 94 test.

The present invention has found that polyphenylene ether acts as synergist with polyphosphonate to achieve a UL 94 test V-1 or V-0 rating at thicknesses of at least about 3.18 mm, a task very difficult and unpredictable to achieve. The unexpectedness of the present invention is exemplified by the five embodiments of the invention described below, which demonstrates the unique ratio and selection of ingredients required to achieve the goal of a desirable level of flame retardancy in nylon 6,6.

Starting with a nylon 6,6 resin, a non-halogenated flame retardant is combined, by mixing or otherwise, with other functional ingredients to achieve that coveted V-1 or V-0 rating at a thickness about 3.18 mm and greater.

One embodiment of the present invention is flame retardant nylon compound, comprising: poly(hexamethylene adipamide); polyphosphonate homopolymer; polyphenylene ether; optionally compatibilizer; and optionally polytetrafluoroethylene. The polyphosphonate homopolymer and the polyphenylene ether combined are about 50 weight percent of the compound or greater, and the polyphosphonate homopolymer is about 20 weight percent of the compound or greater.

In another embodiment of the invention, the flame retardant nylon compound comprises: poly(hexamethylene adipamide); polyphosphonate homopolymer; polyphenylene ether; optionally compatibilizer; and optionally polytetrafluoroethylene. For this embodiment, the polyphosphonate homopolymer and the polyphenylene ether combined are about 45 weight percent of the compound or greater, and the polyphenylene ether has a high molecular weight represented by an intrinsic viscosity of greater than 46 $cm^3/g$ measured in chloroform at 25° C.

In another embodiment of the invention, the flame retardant nylon compound comprises: poly(hexamethylene adipamide); polyphosphonate homopolymer; polyphenylene ether; optionally compatibilizer; and optionally polytetrafluoroethylene. For this embodiment, the polyphosphonate homopolymer and polyphenylene ether combined are about 45 weight percent of the compound or greater, and the polyphenylene ether has a low molecular weight represented intrinsic viscosity of less than 40 $cm^3/g$ measured in chloroform at 25° C.;

In another embodiment of the invention, the flame retardant nylon compound comprises: poly(hexamethylene adipamide); polyphosphonate polyphosphonate-co-carbonate; polyphenylene ether; optionally compatibilizer; and optionally polytetrafluoroethylene. The polyphosphonate-co-carbonate of this embodiment is about 50 weight percent of the compound or greater. In addition, the polyphenylene ether can be about 20 weight percent of the compound or greater.

In another embodiment of the invention, a flame retardant nylon compound comprises: poly(hexamethylene adipamide); polyphosphonate homopolymer, bismaleimides, optionally compatibilizer; and optionally polytetrafluoroethylene. The bismaleimides are about 7.5 weight percent of the compound or greater. In addition, the polyphosphonate homopolymer in this embodiment can be about 30 weight percent of the compound or greater.

Features of the invention will be explored below.

EMBODIMENTS OF THE INVENTION

Poly(Hexamethylene Adipamide)

Poly(hexamethylene adipamide), also known as nylon 6,6, is a type of polyamide having the molecular formula $(C_{12}H_{22}N_2O_2)_n$, which is made through the polycondensation reaction of hexamethylenediamine and adipic acid. The result of this condensation reaction is a semi-crystalline polymer having a backbone that contains amide (—CONH—) linkages. Nylon 6,6 is commercial widely available from several manufacturers, including BASF, DSM, DuPont, Honeywell, Dow, and Bayer MaterialScience LLC.

Polyphosphonate

Polyphosphonates used in this invention are polymer compounds containing repeating monomer units of $CH_3$—

PO(OH)$_2$ or CH$_3$—PO(OH)—OR, where R represents alkyl or aryl groups; or R$^1$O—PO(R$^3$)—OR$^2$, where R$^1$ and R$^2$ are aromatic or aliphatic and R$^3$ represents alkyl C$_1$-C$_6$ or aromatic hydrocarbon group. Polyphosphonates are useful as flame retardants for polymer compounds. Polyphosphonates can be linear or branched. Preferred are polyphosphonate homopolymers having a polyphosphorus content of greater than about 8 weight percent, a glass transition temperature of at least about 100° C., and a limiting oxygen index of about 50% or higher. Also preferred are polyphosphonate homopolymers having a high molecular weight represented by about 10,000 g/mol or higher; and more preferably about 20,000 g/mol or higher.

Alternatively, the polyphosphonate co-polymer polyphosphonate-co-carbonate can be used for this invention, which has an average molecular weight ranging from about 30,000 g/mol to about 50,000 g/mol; a glass transition temperature ranging from about 120° C. to about 133° C.; a percentage phosphorus content of about 3.8 to about 6.5 weight percent of the polyphosphonate-co-carbonate; and a limiting oxygen index ranging from about 40% to about 50%.

FRX Polymers, Inc. of Chelmsford, Mass., USA manufactures flame retardant polyphosphonates, including polyphosphonate homopolymers, such as Nofia™ HM 1100 (also identified as "FRX 100" in the Examples) and polyphosphonate-co-carbonate copolymers, for example Nofia™ CO6000 (also identified as "FRX CO 60" in the Examples).

Polyphenylene Ether

Polyphenylene ether (PPE), also called polyphenylene oxide, is a thermoplastic, linear, non-crystalline polymer. PPE is characterized by a unique combination of chemical, physical and electrical properties over a temperature range of more than 600° F., extending from a brittle point of about −275° F. to a heat distortion temperature of about 375° F. As a result of this combination of properties, PPE is suitable for a broad range of applications. In particular PPE is known for its flame retardance as a char former. The polyphenylene ethers suitable for use in the present invention are well known in the art and may be prepared by any of a number of catalytic and non-catalytic processes from corresponding phenols or reactive derivatives thereof. Commercial manufacturers of PPE include SABIC Innovative Plastics, China National Blue Star, and Evonik Degussa GmbH.

Bismaleimides

Bismaleimides are a class of thermosetting polyimides having two maleimide groups connected by the nitrogen atoms. Maleimide and its derivatives are prepared from maleic anhydride by treatment with amines followed by dehydration. Maleimide is a chemical compound with the formula H$_2$C$_2$(CO)$_2$NH. Bismaleimides can include different functional groups attached, such alkyl or aryl groups such as a methyl or phenyl, respectively. Preferred for the present invention is N,N'-1,3-phenylene bismaleimides represented by CAS #3006-93-7.

Polytetrafluoroethylene

Polytetrafluoroethylene (PTFE) is known to be useful as a drip suppressant because it tends fibrillate and elongate during injection molding. Fibrils shrink upon exposure to heat from a flame and hence retard dripping of the matrix in which the fibrils reside.

PTFE can have a particle size ranging from about 5 μm to about 25 μm with the possibility of aggregation and agglomeration.

PTFE is commercially available from a number of manufacturers, but the best known is the Teflon™ brand from DuPont which invented the polymer.

Though PTFE is fluorinated, its presence in the compound is not regarded by those having skill in the art of flame retardant compounds as compromising the non-halogenated characteristics of the flame retardant itself because the amount of PTFE present is very minor. Therefore, the use of a fluorinated drip suppressant in the amounts identified in this invention does not disqualify the compound from being considered a non-halogenated flame retarded thermoplastic compound according to the course of conduct in the thermoplastic compound industry.

Additional Additives

A variety of additives known to those skilled in the art can be included in nylon 6,6 compounds of the present invention to improve processing or performance properties. In particular, a compatibilizer can be useful in the present invention to prevent a film of the nylon 6,6 compound from delaminating. Ingredients known as compatibilizers for compositions of nylon and polyethylene ether include: maleic anhydride, fumaric acid, citric acid, malic acid, reaction products of a polyphenylene ether and trimellitic anhydride acid chloride and reaction products of a polyphenylene ether and maleic anhydride or fumaric acid.

In addition, the compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (elsevier.com website), can select from many different types of additives for inclusion into the compounds of the present invention.

Non-limiting examples of optional additives include heat stabilizers, char formers, adhesion promoters; biocides; anti-fogging agents; anti-static agents; anti-oxidants; bonding, blowing and foaming agents; dispersants; fillers and extenders; smoke suppressants; impact modifiers; initiators; lubricants; micas; pigments, colorants and dyes; plasticizers; processing aids; release agents; silanes, titanates and zirconates; slip agents, anti-blocking agents; stearates; ultraviolet light absorbers; viscosity regulators; waxes; catalyst deactivators, and combinations of them.

Range of Ingredients

Table 1 shows acceptable, desirable, and preferable ranges of ingredients useful in the present invention, all expressed in weight percent (wt. %) of the entire compound. The compound can comprise, consist essentially of, or consist of these ingredients.

TABLE 1

| Ingredient (Wt. %) | Acceptable | Desirable | Preferable |
|---|---|---|---|
| Poly(hexamethylene adipamide) (Nylon 6,6) | 10-90 | 20-80 | 40-60 |
| Polyphosphonate homopolymer | 20-80 | 25-50 | 25-35 |
| Polyphenylene ether | 10-50 | 10-40 | 15-30 |
| Compatibilizer | 0-5 | 0.5-2 | 0.5-1 |
| Polytetrafluoroethylene | 0-3 | 0-2 | 0-1 |
| Optional Additives | 0-20 | 0-10 | 0-5 |

Alternatively, the polyphenylene ether can be substituted with bismaleimide in an amount of about 7.5% or greater, and preferably in an amount in the range of about 7.5% to about 15%. In addition, the polyphosphonate homopolymer can be replaced by polyphosphonate-co-carbonate used in an amount that is 50 weight percent of the compound or greater.

Processing

The preparation of compounds of the present invention is uncomplicated. The compound of the present can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 350 to about 450 rpm. Typically, the output from the extruder is pelletized for later extrusion or molding into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com website), one can make articles of any conceivable shape and appearance using compounds of the present invention.

USEFULNESS OF THE INVENTION

Nylon 6,6 has an excellent set of properties for many consumer and industrial applications. Some of the uses for nylon 6,6 include: carpets, rugs and home textiles; engineering plastics (automotive, E&E, equipment housings etc.); tire cord (heavy-duty bias ply truck & bus, industrial, off-the-road and agricultural tires); textiles (apparel, hosiery, lingerie, sportswear, swimwear, casual wear, fashion wear, socks, umbrella, luggage, tents, parachutes, sleeping bags, etc.); and film (food packaging, industrial packaging, medical applications).

Any plastic article which is currently made from a nylon 6,6 compound can now be made from the non-halogenated flame retardant compound of this invention. Nylon 6,6 compounds can be shaped by extrusion, molding, calendering, additive manufacturing, 3D printing, thermoforming, or other means of shaping into any plastic article usable in an interior or confined space where fire can cause personal injury or property damage. Therefore, nylon 6,6 compounds that resist burning and dripping are desirable. Literally any plastic article useful in a human-occupied space such as a building, a vehicle, or a tunnel can benefit from the flame retardancy of this nylon 6,6 compound.

A person having ordinary skill in the art may decrease the amount of polyphosphonate, to reduce cost or to minimize the impact of the phosphonate on key physical properties, by leveraging the combined amount of polyphenylene ether and polyphosphonate. In addition, it may be desirable to increase the amount of polyphenylene ether, because it is more hydrolytically stable than polyphosphonates.

By achieving a UL 94 V-0 rating at a thickness as thin as 3.18 mm, it is known that a plastic article having any larger thickness will also achieve a UL 94 V-0 rating.

Underwriters' Laboratories Test No. UL 94 serves as the litmus test for flame retardant thermoplastic compounds. As seen in Table 2, the higher V-0 rating is distinguished from V-1 and V-2 ratings, which are less acceptable if one is seeking the best flame retardance rating. For certain uses, the lower V-1 is acceptable.

TABLE 2

| Criteria Conditions | V-0 | V-1 | V-2 |
|---|---|---|---|
| Afterflame time for each individual specimen $t_1$ or $t_2$ | ≤10 s | ≤30 s | ≤30 s |
| Total afterflame time for any condition set ($t_1$ plus $t_2$ for the 5 specimens) | ≤50 s | ≤250 s | ≤250 s |
| Afterflame plus afterglow time for each individual specimen after the second flame application ($t_2 + t_3$) | ≤30 s | ≤60 s | ≤60 s |
| Afterflame or afterglow of any specimen up to the holding clamp | No | No | No |
| Cotton indicator ignited by flaming particles or drops | No | No | Yes |

Examples provide data for evaluation of the unpredictability of this invention.

EXAMPLES

Table 3 shows the list of ingredients for Comparative Examples A-M and Examples 1-10.

TABLE 3

| Brand | Chemical | Purpose | Maker |
|---|---|---|---|
| Co Nylon 6, 6 Prime PLT, A45/27 AE1 | Poly(hexamethylene adipamide) (Nylon 6,6) CAS # 32131-17-2 | Polymer matrix | Rhodia |
| Nofia ™ HM1100 (FRX-100) | Polyphosphonate homopolymer CAS #68664-06-2 | Non-halogen flame retardant additive | FRX Polymers Inc. |
| Nofia ™ CO6000 (FRX-CO-60) | Polyphosphonate-co-carbonate copolymer CAS #77226-90-5 | Non-halogen flame retardant | FRX Polymers Inc. |
| Blue Star LXR40 PPE | Polyphenylene ether CAS #25134-01-4 Mn = 30,000 g/mol ~37,000 g/mol | Char former | China National Blue Star |
| Low MW PPE | Polyphenylene ether CAS #25134-01-4 Mn = 10,505 g/mol | Char former | Preparation is described below |
| Noryl ® PPO ™ 630-111 | Polyphenylene ether CAS #25134-01-4 Mn = 17,300 g/mol | Char former | Sabic |
| Irganox ® B225 | 50/50 blend of trisarylphosphite and sterically hindered phenolic antioxidant | Heat/processing stabilizers | Ciba |
| TEFLON ® 6C | Polytetrafluoroethylene (PTFE) CAS #9002-84-0 | Anti-dripping agent | DuPont |
| | Maleic Anhydride CAS #108-31-6 | Compatibilizer | Sigma Aldrich |
| Bismaleimides | N,N'-1,3-phenylene bismaleimides CAS #3006-93-7 | Co-additives | Mitsui Chemicals |

Preparation of Low MW Polyphenylene Ether

The Low Molecular Weight (MW) Polyphenylene Ether (PPE) was produced in a 16 mm Prism twin co rotating extruder by mixing Bluestar PPE (from China National Blue Star, LXR40 PPE), BPA (Acros Organic, CAS # 80-05-7) and dicumyl peroxide (AkzoNobel, CAS # 80-43-3) at a weight percent of the overall composition of 98.29%, 0.62% and 1.09% respectively. The mixture was extruded at 320° C. in Zone 1, 310° C. in Zone 2 and 300° C. in Zones 3-9, die temperature 300° C., at 250 RPM into pellets. The molecular weight was determined by gel permeation chromatography (GPC) with chloroform as solvent and polystyrene as reference. Based on the GPC UV calculation, the Low MW PPE has an average weight molecular weight of 58,517 g/mol and a number average molecular weight of 10,505 g/mol.

The ingredients in Table 3 of the Comparative Examples A-M and Examples 1-10 were pre-mixed and then fed into the extruder hopper of a Prism TSE 16 mm twin screw extruder and processed according to the conditions shown in Table 4.

TABLE 4

Extruder Conditions
All Comparative Examples and Examples

| | |
|---|---|
| Extruder Type | Prism TSE 16 mm twin screw extruder |
| Order of Addition | All ingredients mixed together and fed into the extruder hopper. |
| Zone 1 (set) | 295° C. |
| Zone 2 (set) | 295° C. |
| Zone 3 (set) | 295° C. |
| Zone 4 (set) | 295° C. |
| Zone 5 (set) | 295° C. |
| Zone 6 (set) | 295° C. |
| Zone 7(set) | 295° C. |
| Zone 8(set) | 295° C. |
| Zone 9 (set) | 295° C. |
| Die | 300° C. |
| RPM | 400 |

The extrudate was pelletized for later molding.

Before molding, the pellets were dried for 16 hours at 80° C. to reduce moisture content.

Using a 88 Nissei molding machine, Table 5 shows the settings used to mold test bars of each Example and Comparative Example having a thickness of about 1.59 mm (1/16 inch) and about 3.18 mm (1/8 inch).

TABLE 5

Molding Conditions
All Comparative Examples and Examples
88 Nissei molding machine Drying Conditions before Molding:

| | |
|---|---|
| Temperature (° C.) | 80 |
| Time (hours) | 16 |

TABLE 5-continued

Molding Conditions
All Comparative Examples and Examples
88 Nissei molding machine Temperatures:

| | |
|---|---|
| Nozzle (° F.) | 540 |
| Zone 1 (° F.) | 530 |
| Zone 2 (° F.) | 520 |
| Zone 3 (° F.) | 520 |
| Mold (° F.) | 160 |
| Oil Temp (° F.) | 86 |

Speeds:

| | |
|---|---|
| Screw RPM (%) | 65% |
| Inj Vel Stg 1 | 40% |
| Inj Vel Stg 2 | 40% |
| Inj Vel Stg 3 | 30% |
| Inj Vel Stg 4 | 20% |
| Inj Vel Stg 5 | 15% |

Pressures:

| | |
|---|---|
| Inj Press Stg-Time (sec) | 5 |
| Injection Pressure | 90% |
| Hold Pressure | 25% |
| Back Pressure | 5% |

Timers:

| | |
|---|---|
| Injection Hold (sec) | 6 |
| Cooling Time (sec) | 20 |

Operation Settings:

| | |
|---|---|
| Shot Size (mm) | 38 |
| Cushion (mm) | 3.7 |

Performance Results

Table 6-A shows the amount of ingredients in weight percent of the compound, and the flame performance tested, for Comparative Examples A-M. Table 6-B shows the amount of the ingredients in weight percent of the compound, and the flame performance tested, for Examples 1-10. Any reference to percent (%) in the discussion of the Examples further below represents the weight percent of the compound unless specified otherwise. Acceptable flammability performance was V-1 or the higher V-0 at 3.18 mm (or 1/8 of an inch) thickness. Each UL rating was verified by two independent tests. The lower (i.e. the worse) flame retardancy performance is reported as the UL rating for Tables 6-A and 6-B. If a sample did not achieve a V-2 rating or better it is designated as having "No-rating."

TABLE 6-A

| | Examples | | | | | | | | | | | | |
|---|---|---|---|---|---|---|---|---|---|---|---|---|---|
| | A | B | C | D | E | F | G | H | I | J | K | L | M |
| Poly(hexamethylene adipamide) (Nylon 6,6) | 58.9 | 58.9 | 53.9 | 58.9 | 48.9 | 68.9 | 63.9 | 58.9 | 99.4 | 59.4 | 58.9 | 48.9 | 58.9 |
| Polyphosphonate homopolymer | 25.0 | 25.0 | 25.0 | 25.0 | | 30.0 | 30.0 | 30.0 | | 40.0 | 20.0 | 10.0 | |
| Polyphosphonate-co-carbonate | | | | | 30.0 | | | | | | | | |

TABLE 6-A-continued

| | \multicolumn{13}{c}{Examples} | | | | | | | | | | | | |
|---|---|---|---|---|---|---|---|---|---|---|---|---|---|
| | A | B | C | D | E | F | G | H | I | J | K | L | M |
| PPE (Mn = 30,000 g/mol~ 37,000 g/mol) | 15.0 | | | | 20.0 | | 5.00 | 10.00 | | | 20.0 | 40.0 | 40.0 |
| PPE (Mn = 10,505 g/mol) | | 15.0 | | | | | | | | | | | |
| PPE (Mn = 17,300 g/mol) | | | 20.0 | 15.0 | | | | | | | | | |
| Poly-tetrafluoroethylene (PTFE) | 0.5 | 0.5 | 0.5 | 0.5 | 0.5 | 0.5 | 0.5 | 0.5 | 0.5 | 0.5 | 0.5 | 0.5 | 0.5 |
| Maleic anhydride | 0.5 | 0.5 | 0.5 | 0.5 | 0.5 | 0.5 | 0.5 | 0.5 | | | 0.5 | 0.5 | 0.5 |
| Stabilizer | 0.1 | 0.1 | 0.1 | 0.1 | 0.1 | 0.1 | 0.1 | 0.1 | 0.1 | 0.1 | 0.1 | 0.1 | 0.1 |
| Bismaleimides | | | | | | | | | | | | | |
| Total | 100 | 100 | 100 | 100 | 100 | 100 | 100 | 100 | 100 | 100 | 100 | 100 | 100 |
| | \multicolumn{13}{c}{Test Results} | | | | | | | | | | | | |
| Molded part thickness (mm) | 3.18 | 3.18 | 3.18 | 3.18 | 3.18 | 3.18 | 3.18 | 3.18 | 3.18 | 3.18 | 3.18 | 3.18 | 3.18 |
| Dipped/Ignited cotton | No | No | No | No | No | No | No | No | No | No | No | No | Yes |
| UL 94 rating | No-rating | No-rating | No-rating | No-rating | No-rating | No-rating | No-rating | No-rating | No-rating | No-rating | No-rating | No-rating | No-rating |

TABLE 6-B

| | \multicolumn{10}{c}{Examples} | | | | | | | | | |
|---|---|---|---|---|---|---|---|---|---|---|
| | 1 | 2 | 3 | 4 | 5 | 6 | 7 | 8 | 9 | 10 |
| Poly(hexamethylene adipamide) (Nylon 6,6) | 48.9 | 53.9 | 53.9 | 49.4 | 54.4 | 53.9 | 53.9 | 28.9 | 53.9 | 48.90 |
| Polyphosphonate homopolymer | 30.0 | 25.0 | 25.0 | 30.0 | 30.0 | 30.0 | 30.0 | | 30.0 | 20.0 |
| Polyphosphonate-co-carbonate | | | | | | | | 50.0 | | |
| PPE (Mn = 30,000 g/mol~ 37,000 g/mol) | 20.0 | 20.0 | | 20.0 | 15.0 | 15.0 | | 20.0 | 7.50 | 30.0 |
| PPE (Mn = 10,505 g/mol) | | | 20.0 | | | | | | | |
| PPE (Mn = 17,300 g/mol) | | | | | | | | | | |
| Poly-tetrafluoroethylene (PTFE) | 0.5 | 0.5 | 0.5 | | | 0.5 | 0.5 | 0.5 | 0.5 | 0.50 |
| Maleic anhydride | 0.5 | 0.5 | 0.5 | 0.5 | 0.5 | 0.5 | 0.5 | 0.5 | 0.50 | 0.50 |
| Stabilizer | 0.1 | 0.1 | 0.1 | 0.1 | 0.1 | 0.1 | 0.1 | 0.1 | 0.1 | 0.1 |
| Bismaleimides | | | | | | | 15 | | 7.50 | |
| Total | 100 | 100 | 100 | 100 | 100 | 100 | 100 | 100 | 100 | 100 |
| | \multicolumn{10}{c}{Test Results} | | | | | | | | | |
| Molded part thickness (mm) | 3.18 | 3.18 | 3.18 | 3.18 | 3.18 | 3.18 | 3.18 | 3.18 | 3.18 | 3.18 |
| Dripped/Ignited cotton | No | No | No | No | No | No | No | No | No | No |
| UL 94 rating | V-0 | V-1 | V-0 | V-0 | V-0 | V-0 | V-1 | V-0 | V-0 | V-0 |

A wide array of screen tests were initially performed to identify a set of formulations for further investigation as molded articles, which are described herein. The following examples show the unique synergistic relationship between polyphosphonate, PPE and bismaleimides to make flame retardant nylon 6,6 compounds. Comparative Example I showed a compound of 99% nylon 6,6 is flammable, as represented by having no UL 94 rating. Comparative Example M demonstrated that a significant amount of PPE (40%) added to nylon 6,6, without any polyphosphonate, failed to improve the compound's flame retardancy. Comparative Examples F and J demonstrate that a significant amount of polyphosphonate homopolymer (30% and 40% respectively) added to nylon 6,6, without any PPE, failed to improve the compound's flame retardancy.

Adding 10% polyphosphonate homopolymer with PPE in Comparative Example L still resulted in a no UL 94 rating. However, unexpectedly, in Example 10, a minimum of 20% polyphosphonate homopolymer with a combination of 50% or greater PPE and polyphosphonate homopolymer, resulted in a V-0 UL 94 rating for a thickness of 3.18 mm.

In addition, Examples 1 and 4 demonstrated a V-0 rating with (i) a minimum of 20% polyphosphonate homopolymer, and (ii) the amount of PPE and polyphosphonate homopolymer together being 50% or greater. On the other hand, Comparative Examples A-D, G, H, and K, which had PPE and polyphosphonate homopolymer in an amount of less then 50% of the compound, did not achieve an acceptable flame retardancy rating.

Examples 2, 5 and 6 revealed that the amount of PPE and polyphosphonate homopolymer can be reduced to the amount of 45% when using a high molecular weight PPE. High molecular weight PPE is defined as a PPE having an intrinsic viscosity of greater than 46 cm$^3$/g measured in chloroform at 25° C. Examples 5 and 6 also showed PTFE was optional, and was not required to achieve the V-0 rating.

Example 3 further revealed that the amount of PPE and polyphosphonate homopolymer can be reduced to the amount of 45% when using a low molecular weight PPE. Low molecular weight PPE is defined as a PPE having an intrinsic viscosity of less than 40 cm$^3$/g measured in chloroform at 25° C.

When replacing the polyphosphonate homopolymer with polyphosphonate-co-carbonate in Comparative Example E and Example 8, the results showed that a minimum of 50% polyphosphonate-co-carbonate is required to achieve a flame retardant UL 94 rating at a thickness of 3.18 mm.

Finally Examples 7 and 9 demonstrated that substituting PPE with as little as 7.5% bismaleimides with flame retardant polyphosphonate achieved a V-0 rating at a thickness of 3.18 mm; and a V-1 rating at a thickness of 3.18 mm using 15% bismaleimides with flame retardant polyphosphonate, respectively.

Maleic anhydride was added to act as a compatibilizer to examples for the purpose of being able to use the compound as a film annealed to a substrate.

The invention is not limited to the above embodiments. The claims follow.

What is claimed is:

1. A flame retardant nylon compound consisting of:
   (a) poly(hexamethylene adipamide);
   (b) polyphosphonate homopolymer in an amount ranging from about 20 to about 30 weight percent, by weight of the compound;
   (c) polyphenylene ether in an amount ranging from about 20 to about 30 weight percent, by weight of the compound;
   (d) maleic anhydride compatibilizer;
   (e) polytetrafluoroethylene; and
   (f) stabilizer, wherein the stabilizer is a blend of trisarylphosphite and sterically hindered phenolic antioxidant;
   wherein the polyphosphonate homopolymer and the polyphenylene ether are present in a combined amount of about 50 weight percent, by weight of the compound; and
   wherein the compound, when injection molded at a thickness of about 3.18 mm, has a UL 94 rating of V-0.

2. The flame retardant nylon compound of claim 1, wherein the polyphosphonate homopolymer has a phosphorus content of greater than about 8 weight percent, a glass transition temperature of at least about 100° C., and a limiting oxygen index of about 50% or higher.

3. A plastic article shaped from the flame retardant nylon compound of claim 1.

4. A flame retardant nylon compound consisting of:
   (a) poly(hexamethylene adipamide) in an amount ranging from about 48.9 to about 49.4 weight percent, by weight of the compound;
   (b) polyphosphonate homopolymer in an amount ranging from about 20 to about 30 weight percent, by weight of the compound;
   (c) polyphenylene ether in an amount ranging from about 20 to about 30 weight percent, by weight of the compound;
   (d) maleic anhydride compatibilizer in an amount of about 0.5 weight percent, by weight of the compound;
   (e) polytetrafluoroethylene in an amount of about 0.5 weight percent, by weight of the compound; and
   (f) stabilizer in an amount of about 0.1 weight percent, by weight of the compound, wherein the stabilizer is a blend of trisarylphosphite and sterically hindered phenolic antioxidant;
   wherein the polyphosphonate homopolymer and the polyphenylene ether are present in a combined amount of about 50 weight percent, by weight of the compound; and
   wherein the compound, when injection molded at a thickness of about 3.18 mm, has a UL 94 rating of V-0.

5. The flame retardant nylon compound of claim 4, wherein the polyphosphonate homopolymer has a phosphorus content of greater than about 8 weight percent, a glass transition temperature of at least about 100° C., and a limiting oxygen index of about 50% or higher.

6. A plastic article shaped from the flame retardant nylon compound of claim 4.

7. A flame retardant nylon compound consisting of:
   (a) poly(hexamethylene adipamide);
   (b) polyphosphonate homopolymer in an amount ranging from about 20 to about 30 weight percent, by weight of the compound;
   (c) polyphenylene ether in an amount ranging from about 20 to about 30 weight percent, by weight of the compound;
   (d) maleic anhydride compatibilizer;
   (e) polytetrafluoroethylene; and
   (f) stabilizer, wherein the stabilizer is a blend of trisarylphosphite and sterically hindered phenolic antioxidant; and
   (g) optionally pigment, colorant, or dye;
   wherein the polyphosphonate homopolymer and the polyphenylene ether are present in a combined amount of about 50 weight percent, by weight of the compound; and
   wherein the compound, when injection molded at a thickness of about 3.18 mm, has a UL 94 rating of V-0.

8. The flame retardant nylon compound of claim 7, wherein the polyphosphonate homopolymer has a phosphorus content of greater than about 8 weight percent, a glass transition temperature of at least about 100° C., and a limiting oxygen index of about 50% or higher.

9. A plastic article shaped from the flame retardant nylon compound of claim 7.

* * * * *